Patented June 16, 1953

2,642,458

UNITED STATES PATENT OFFICE 2,642,458

PROCESS OF PREPARING 2-SULFOBENZOIC ACID

Floyd B. Erickson, Dayton, Ohio, assignor to Monsanto Chemical Company, St. Louis, Mo., a corporation of Delaware No Drawing. Application July 26, 1950, Serial No. 176,082

5 Claims. (Cl. 260—507)

The present invention relates to sulfo carboxylic acids and deals more particularly with the preparation of 2-sulfobenzoic acid.

Previous processes for the manufacture of 2-sulfobenzoic acid have been based on the use of such difficultly available starting materials as 2-toluenesulfonic acid, 2-toluenesulfonamide, 2-thiosalicyclic acid, etc. Separation of these 2-isomers from the other isomers which are also formed in commercial processes for their manufacture can be accomplished only with difficulty. Hence, laboratory methods directed to an easy, rather than economical preparation of pure 2-sulfobenzoic acid generally advise such initial starting materials as saccharin. The use of this type of material for the technical manufacture of 2-sulfobenzoic acid is obviously impractical; for the methods customarily employed for their preparation involve the use of 2-sulfobenzoic acid as an intermediate.

Now I have found that 2-sulfobenzoic acid can be readily obtained from thianaphthene, a starting material which may be readily prepared, free from any difficultly separated isomers, and on a commercial scale, for example, by reaction of ethylbenzene or styrene with hydrogen sulfide.

According to the invention herein disclosed I have prepared 2-sulfobenzoic acid by oxidizing thianaphthene. While the prior art shows oxidation of thianaphthene to thianaphthene-1-dioxide, for example, by reaction of thianaphthene with hydrogen peroxide in acetic acid solution, the oxidation of thianaphthene with ring cleavage and formation of 2-sulfobenzoic acid in good yields could not have been foretold from a study of the known reactions of that compound.

The conversion of thianaphthene to 2-sulfobenzoic acid may be accomplished generally by submitting thianaphthene in liquid phase to strong oxidizing conditions. As oxidizing agents there may be employed alkali metal permanganates or dichromates, such as potassium permanganate or sodium dichromate, chromic acid, aqueous nitric acid, etc. The oxidation is brought about by contacting thianaphthene with the oxidizing agent at ordinary or increased pressures, depending upon the oxidizing agent, until formation of the 2-sulfobenzoic acid is achieved. When using potassium permanganate as the oxidizing agent, I preferably reflux a mixture of the thianaphthene with an alkaline solution of the permanganate. Inasmuch as the oxidation proceeds with reduction of the permanganate to manganese dioxide whereby there is effected oxidation of one of the thianaphthene carbon atoms, a molar excess of the permanganate with respect to the thianaphthene should be employed. Preferably, I use at least one and one-tenth times the theoretical quantity of permanganate per mole of thianaphthene. Refluxing is continued until complete conversion of the thianaphthene has been completed; this point may be ascertained by noting the disappearance of the permanganate in the reaction mixture. The 2-sulfobenzoic acid is then readily recovered from the reaction mixture by removing the manganese dioxide formed, for example, by filtering.

The invention is further illustrated, but not limited, by the following example:

Example

A mixture consisting of 25 g. of thianaphthene, 10 g. of potassium hydroxide and 475 ml. of water was refluxed with stirring, for about 9 hours during which time 178 g. of potassium permanganate was added portionwise. Subsequently, any excess of permanganate which was present was destroyed by treating it with sulfur dioxide. The reaction mixture was then filtered for removal of manganese dioxide and the filtrate was evaporated to near dryness. Extraction of the solid with hot alcohol and evaporation of the resulting extract to remove the alcohol gave a viscous liquid which partially solidified upon standing. Filtration of this mass and desiccation of the solid thus obtained gave substantially pure 2-sulfobenzoic acid. Additional quantities of 2-sulfobenzoic acid were obtained from the filtrate by treating it in alcohol with barium carbonate for conversion into the barium sulfonate and hydrolysis of the sulfonate with sulfuric acid to yield the 2-sulfobenzoic acid.

The procedure employed above may be generally varied. Instead of operating at refluxing temperatures when effecting the oxidation with potassium permanganate the oxidation may be effected at higher or lower temperatures and even at ordinary temperatures, the reaction time being proportionately varied. Also instead of destroying any excess of potassium permanganate which may be present by treatment with sulfur dioxide for conversion into the water-soluble manganese sulfate, the permanganate may be destroyed by other reagents such as sodium bisulfite or thiosulfate, etc. If desired, particularly if only very small quantities of the permanganate are present, the oxidizing agent need not be removed from the reaction mixture previous to extraction of the sulfobenzoic acid. Ordinarily, however, repeated extraction is necessitated if any considerable amount of the permanganate is present in the material which is being extracted. Also, as will be apparent to those skilled in the art other means for recovering the 2-sulfobenzoic acid from the oxidation mixture may be employed, e. g., other extracting agents may be employed, or the 2-sulfobenzoic acid may be converted into insoluble salts, etc.

What I claim is:

1. The process of preparing 2-sulfobenzoic acid which comprises heating thianaphthene, in the liquid phase with a molar excess of an oxidizing agent selected from the class consisting of alkali metal permanganates, alkali metal dichromates, chromic acid and aqueous nitric acid.

2. The process of preparing 2-sulfobenzoic acid which comprises refluxing thianaphthene, in the liquid phase with a molar excess of an oxidizing agent selected from the class consisting of alkali metal permanganates, alkali metal dichromates, chromic acid and aqueous nitric acid.

3. The process of preparing 2-sulfobenzoic acid which comprises heating thianaphthene, in the liquid phase with a molar excess of an alkali metal permanganate.

4. The process which comprises heating thianaphthene, in the liquid phase with a molar excess of alkali metal permanganate, removing manganese dioxide from the resulting reaction product and recovering 2-sulfobenzoic acid.

5. The process of preparing 2-sulfobenzoic acid which comprises refluxing thianaphthene, in the liquid phase with a molar excess of potassium permanganate.

FLOYD B. ERICKSON.

References Cited in the file of this patent

Lanfry, Comptes rendus de l'Academie des Sciences, vol. 154, p. 519.